(12) United States Patent
Yamauchi

(10) Patent No.: US 7,190,646 B1
(45) Date of Patent: Mar. 13, 2007

(54) APPARATUS FOR AND METHOD OF RECORDING AND REPRODUCING INFORMATION

(75) Inventor: Keiichi Yamauchi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 355 days.

(21) Appl. No.: 09/715,009

(22) Filed: Nov. 20, 2000

(30) Foreign Application Priority Data

Nov. 18, 1999  (JP)  .............................. P11-328368
Nov. 26, 1999  (JP)  .............................. P11-336194

(51) Int. Cl.
   *G11B 7/28* (2006.01)
(52) U.S. Cl. ............................... 369/47.12; 369/47.33; 369/53.37; 369/124.06; 369/84; 369/30.19
(58) Field of Classification Search ............... 369/47.1, 369/47.29, 53.24, 47.23, 50.83, 53.31, 47.55, 369/53.37, 84, 13.37, 47.12, 124.06, 30.19, 369/13.02, 30.03, 53.2, 30.05, 275.1, 47.33, 369/30.25; 360/15, 31, 55, 13, 32, 75; 382/251, 382/4; 725/115, 119, 240.25; 711/112, 118; 386/70, 125, 126; 701/201, 208, 210
See application file for complete search history.

(56) References Cited

U.S. PATENT DOCUMENTS

| | | | | |
|---|---|---|---|---|
| 5,363,364 A | * | 11/1994 | Torazawa et al. | 369/124.06 |
| 5,412,628 A | * | 5/1995 | Yamazaki et al. | 369/30.19 |
| 5,414,684 A | * | 5/1995 | Nonaka et al. | 369/53.2 |
| 5,586,264 A | * | 12/1996 | Belknap et al. | 725/115 |
| 5,636,311 A | * | 6/1997 | Nakatani | 386/4 |
| 5,682,273 A | * | 10/1997 | Hetzler | 360/75 |
| 5,719,983 A | * | 2/1998 | Henderson et al. | 386/70 |
| 5,737,747 A | * | 4/1998 | Vishlitzky et al. | 711/118 |
| 5,883,670 A | * | 3/1999 | Sporer et al. | 375/240.25 |
| 5,886,957 A | * | 3/1999 | Yokota et al. | 369/13.37 |
| 5,943,311 A | * | 8/1999 | Takenaka | 369/47.12 |

(Continued)

FOREIGN PATENT DOCUMENTS

| | | |
|---|---|---|
| EP | 0 944 080 A1 | 9/1999 |
| JP | 07-31875 | 11/1988 |

(Continued)

OTHER PUBLICATIONS

Japanese Abstract No. 11212599, dated Aug. 6, 1999.

(Continued)

*Primary Examiner*—Andrea Wellington
*Assistant Examiner*—Kim-Kwok Chu
(74) *Attorney, Agent, or Firm*—Sughrue Mion, PLLC

(57) ABSTRACT

An information recording and reproducing apparatus (S) is provided with: a first reproducing device (11) for reproducing audio information from a first information record medium (DK), in which the audio information is recorded; a recording device (28) for recording the reproduced audio information into a second information record medium (HD); a second reproducing device (28) for reproducing the audio information recorded in the second information record medium; and a controlling device (6) for setting a recording speed when recording the audio information into the second information record medium and a reproducing speed when reproducing the audio information from the second information record medium such that the recording speed is equal to or higher than the reproducing speed, and controlling the second reproducing device and the recording device so as to perform reproducing the recorded audio information from the second information record medium at the set reproducing speed in parallel to recording the audio information into the second information record medium at the set recording speed.

18 Claims, 5 Drawing Sheets

U.S. PATENT DOCUMENTS

| | | | |
|---|---|---|---|
| 5,963,521 A | * 10/1999 | Nagashima et al. | 369/53.37 |
| 6,091,857 A | * 7/2000 | Shaw et al. | 382/251 |
| 6,137,642 A | * 10/2000 | Inoue | 369/53.24 |
| 6,272,088 B1 | * 8/2001 | Aramaki et al. | 369/53.24 |

FOREIGN PATENT DOCUMENTS

| | | |
|---|---|---|
| JP | 2626105 | 8/1991 |
| JP | 05-235698 | 9/1993 |
| JP | 06-259945 A | 9/1994 |
| JP | 07-006567 | 1/1995 |
| JP | 08-248953 | 9/1996 |
| JP | 09-063191 | 3/1997 |
| JP | 09-113286 | 5/1997 |
| JP | 10-255380 | 9/1998 |
| JP | 11-203849 | 7/1999 |
| JP | 11-288547 | 10/1999 |
| JP | 2001-195825 | 7/2001 |
| WO | WO 99/42996 | 8/1999 |

OTHER PUBLICATIONS

Japanese Abstract No. 10214025, dated Aug. 11, 1998.
Japanese Abstract No. 09113286, dated May 2, 1997.
Office Action dated Dec. 1, 2006 issued in corresponding Japanese Patent Application No. 1111-336194.

* cited by examiner

APPARATUS FOR AND METHOD OF RECORDING AND REPRODUCING INFORMATION

BACKGROUND OF THE INVENTION

1. Field of the Invention

The present invention relates to an apparatus for and a method of recording and reproducing information, and more particularly relates to an apparatus for and a method of recording and reproducing information, which can copy and record audio information from one information record medium to another information record medium.

2. Description of the Related Art

In recent years, it has been popularized to install a CD (Compact Disc) player or a DVD (which is an optical disc having a record capacity several times of that of the CD) player, in which music is recorded, in a vehicle or car, and then enjoy the music and the like while driving the vehicle.

Here, when such a case is considered that the content of the CD for the music reproduction or the like is necessary to be copied (recorded) to another information record medium such as a hard disc device which can carry out a fast search (such a necessity occurs, for example, when it is necessary to carry out a reproduction control, such as a so-called "random access" and the like, faster than those of the CD and the like), a method has been typically used in which the record content of the CD is once listened to and is further copied to the hard disc device and the like.

On the other hand, it has been recently popularized to install a so-called navigation apparatus in a vehicle or car to accordingly assist a driving operation of the vehicle.

Typically, in the conventional navigation apparatus, a map information is recorded on a dedicated CD-ROM (CD-Read Only Memory) or DVD-ROM, and is read out as the occasion demands, so that a map and the like are displayed.

Thus, when the reproduction of the music from the CD or the like is tried within the vehicle having the navigation apparatus, if the CD-ROM for the navigation and the CD for the music reproduction can be reproduced by using a common player, this method is especially advantageous within a narrow vehicle, from the viewpoint of the saving of an installation place and the like.

However, if the CD-ROM for the navigation and the CD for the music reproduction are reproduced by using the common player as mentioned above, this results in a problem that the navigation function cannot be used during the reproduction of the CD for the music reproduction.

Thus, it is desirable that a time period while the player is occupied by the CD for the music reproduction is as short as possible. This implies that, when the CD for the music reproduction is copied to another information record medium within the vehicle, it is desirable to make the time period required to copy the music as short as possible.

SUMMARY OF THE INVENTION

The present invention is proposed in view of the above mentioned problems. It is therefore an object of the present invention to provide an apparatus for and a method of recording and reproducing information, which can effectively carry out copying audio information such as music or the like in case that, for example, it is desirable to copy the audio information in a short time period while reproducing the audio information within a movable body such as a vehicle or car.

The above object of the present invention can be achieved by a first information recording and reproducing apparatus provided with: a first reproducing device, such as a DVD-ROM drive or the like, for reproducing audio information from a first information record medium, such as a DVD audio disc or the like, in which the audio information is recorded; a recording device, such as a HD (Hard Disc) drive or the like, for recording the reproduced audio information into a second information record medium, such as a hard disc or the like; a second reproducing device, such as a HD drive or the like, for reproducing the audio information recorded in the second information record medium; and a controlling device such as a CPU for setting a recording speed when recording the audio information into the second information record medium and a reproducing speed when reproducing the audio information from the second information record medium such that the recording speed is equal to or higher than the reproducing speed, and controlling the second reproducing device and the recording device so as to perform reproducing the recorded audio information from the second information record medium at the set reproducing speed in parallel to recording the audio information into the second information record medium at the set recording speed.

According to the first information recording and reproducing apparatus of the present invention, since the operation of recording the audio information into the second information record medium is performed at the recording speed, which is equal to or higher than the reproducing speed of the operation of reproducing the audio information from the second information record medium, it is possible to record the audio information speedily into the second information record medium while it is possible to reproduce the audio information from the second information record medium in parallel to this recording operation.

Thus, for example, it is possible to copy and record the audio information in a short time while reproducing the audio information within the moving vehicle.

In one aspect of the first information recording and reproducing apparatus of the present invention, the controlling device sets the recording speed and the reproducing speed such that the recording speed is equal to or faster than two times the reproducing speed.

According to this aspect, it is possible to reproduce the audio information from the second information record medium while recording the audio information into the second information record medium more speedily.

In another aspect of the first information recording and reproducing apparatus of the present invention, the controlling device sets the recording speed and the reproducing speed equal to each other, and controls the second reproducing device and the recording device so that the second reproducing device starts reproducing after the recording device starts recording.

According to this aspect, since the reproducing speed and the recording speed are equal to each other and since the reproduction of the audio information from the second information record medium is started at a timing later than the timing of starting the record, it is possible to reproduce the recorded audio information from the second information record medium without interruption or intermittence.

In another aspect of the first information recording and reproducing apparatus of the present invention, the controlling device controls the first reproducing device and the recording device so as to convert a form of the audio information reproduced from the first information record medium and then record the audio information into the second information record medium.

According to this aspect, it is possible to speedily complete recording the audio information in the converted form.

In another aspect of the first information recording and reproducing apparatus of the present invention, the controlling device controls the recording device so as to compress the audio information, which is reproduced by the first reproducing device, and record the compressed audio information into the second information record medium, and controls the second reproducing device so as to reproduce the audio information from the second information record medium, expand the reproduced audio information and output the reproduced and expanded audio information to an external portion.

According to this aspect, even if the audio information is recorded in the non-compressed state in the first information record medium, it is possible to speedily record the audio information into the second information record medium in the compressed state while saving the memory capacity of the second information record medium.

In another aspect of the first information recording and reproducing apparatus of the present invention, the controlling device controls the recording device so as to record information indicative of a portion of the audio information, which is being recorded at a time of stopping a recording operation of recording the audio information into the second information record medium, into the second information record medium and then stop the recording operation, when the recording operation is to be stopped in a middle of recording the audio information into the second information record medium.

According to this aspect, when the operation of recording the audio information into the second information record medium is resumed, it is possible to prevent the same portion of the audio information from being recorded redundantly into the second information record medium by resuming the recording operation on the basis of the information indicative of the portion.

In this aspect, the controlling device may control the recording device so as to output stop information indicative of stopping the recording operation to an external portion, when the recording operation is to be stopped in the middle.

By constituting in this manner, it is possible for the user to recognize the fact that the operation of recording the audio information is stopped.

Also, in this aspect, the recording operation may be stopped by stopping a main electric power supplying device, such as a battery or the like, for supplying an electric power to the information recording and reproducing apparatus in a normal operation, and the information recording and reproducing apparatus may be further provided with a sub electric power supplying device, such as a battery or the like, for supplying an electric power to the information recording and reproducing apparatus after the main electric power supplying device is stopped.

By constituting in this manner, it is possible to perform outputting the information indicative of the portion or the stop information by continuing the supply of the electric power even if the operation of recording the audio information is stopped as the main electric power supply is stopped.

In another aspect of the first information recording and reproducing apparatus of the present invention, the apparatus is further provided with a compressing device for reproducing the recorded audio information from the second information record medium, compressing the reproduced audio information, and recording again the compressed reproduced audio information into the second information record medium.

According to this aspect, even if the audio information is recorded in the non-compressed state in the first information record medium, it is possible to record the audio information into the second information record medium while saving the memory capacity of the second information record medium.

In another aspect of the first information recording and reproducing apparatus of the present invention, the first information record medium comprises an optical disc, and the second information record medium comprises a magnetic disc.

According to this aspect, it is possible to speedily record the reproduced audio information.

In another aspect of the first information recording and reproducing apparatus of the present invention, on the second information record medium, map information to control a navigation function is further recorded, and the apparatus is further provided with a navigation device for controlling the navigation function by using the map information.

According to this aspect, the recording operation of the audio information and the navigation function using the map information can be performed by means of just one information record medium.

The above object of the present invention can be achieved by a second information recording and reproducing apparatus provided with: a first reproducing device, such as a DVD-ROM drive or the like, for reproducing audio information from a first information record medium, such as a DVD audio disc or the like, in which the audio information is recorded; a recording device, such as a HD drive or the like, for recording the reproduced audio information into a second information record medium, such as a hard disc or the like; a second reproducing device, such as a HD drive or the like, for reproducing the audio information recorded in the second information record medium; and a controlling device, such as a CPU or the like, for controlling the recording device to record the audio information, which is reproduced from the first information record medium by the first reproducing device, when the audio information is outputted as a sound and also controlling the second reproducing device to reproduce and output the audio information as the sound According to the second information recording and reproducing apparatus of the present invention, it is possible to record the audio information into the second information record medium while reproducing and outputting the audio information as the sound from the second information record medium.

In one aspect of the second information recording and reproducing apparatus of the present invention, the apparatus is further provided with a converting device for converting a form of the audio information, and the controlling device controls the converting device and the recording device to convert the form of the audio information and then record the audio information when recording the audio information reproduced by the first reproducing device into the second information record medium.

According to this aspect, it is possible to record the audio information into the second information record medium with converting the form of the audio information, while reproducing and outputting the audio information as the sound from the second information record medium.

In another aspect of the second information recording and reproducing apparatus of the present invention, the apparatus is further provided with: a compressing device for compressing the audio information; and an expanding device for expanding the compressed audio information. The controlling device controls the compressing device and the recording device to compress the audio information and then record the compressed audio information when recording the audio information, which is reproduced by the first reproducing device, into the second information record medium. The controlling device controls the second reproducing device and the expanding device to reproduce the compressed audio information, expand the reproduced audio information and then output the expanded audio information as a sound.

According to this aspect, by compressing and recording the audio information into the second information record medium, it is possible to record the audio information with efficiently using the memory area of the second information record medium.

The above object of the present invention can be also achieved by a third information recording and reproducing apparatus of the present invention, provided with: a reproducing device, such as a DVD-ROM drive or the like, for reproducing audio information from a first information record medium, such as a DVD audio disc or the like, in which the audio information is recorded; a recording device, such as a HD drive or the like, for recording the reproduced audio information into a second information record medium, such as a hard disc or the like; and a controlling device, such as a CPU or the like, for controlling the reproducing device and the recording device so as to perform recording the reproduced audio information into the second information record medium in parallel to reproducing the audio information from the first information record medium.

According to the third information recording and reproducing apparatus of the present invention, since the operation of recording the audio information into the second information record medium is performed in parallel to the operation of reproducing the audio information from the first information record medium, it is possible to complete recording the audio information in a short time while the reproducing operation.

Thus, for example, it is possible to efficiently copy and record the audio information in a short time while reproducing the audio information within the moving vehicle.

In one aspect of the third information recording and reproducing apparatus of the present invention, the apparatus is further provided with a converting device for converting a form of the audio information, which is reproduced from the first information record medium. The recording device records the converted audio information into the second information record medium.

According to this aspect, it is possible to complete recording the audio information into the second information record medium with converting the form of the audio information.

In another aspect of the third information recording and reproducing apparatus of the present invention, the audio information is recorded in the first information record medium in a non-compressed state, and the recording device compresses the audio information in the non-compressed state and then records the compressed audio information into the second information record medium.

According to this aspect, even if the audio information is recorded in the first information record medium in the non-compressed state, it is possible to record the audio information in the compressed state into the second information record medium while saving the memory capacity of the second information record medium.

In another aspect of the third information recording and reproducing apparatus of the present invention, the audio information is recorded in the first information record medium in a compressed state, the reproducing device comprises an expanding device for expanding the audio information in the compressed state, and the recording device records the expanded audio information into the second information record medium.

According to this aspect, it is possible to speedily record the audio information in the expanded state into the second information record medium.

In another aspect of the third information recording and reproducing apparatus of the present invention, the audio information is recorded in the first information record medium in a compressed state, the reproducing device comprises a decoding device, such as a DVD-ROM drive or the like, for expanding and decoding the audio information in the compressed state, and the recording device again compresses the expanded and decoded audio information and then records the again compressed audio information into the second information record medium.

According to this aspect, it is possible to expand the audio information in the compressed state, compress this expanded audio information again, and then record this again compressed audio information into the second information record medium.

In another aspect of the third information recording and reproducing apparatus of the present invention, the audio information is recorded in the first information record medium in a compressed state, and the recording device records the audio information in the compressed state into the second information record medium.

According to this aspect, it is possible to speedily record the audio information in the compressed state into the second information record medium as it is.

In another aspect of the third information recording and reproducing apparatus of the present invention, the audio information is recorded in the first information record medium in a compressed state based on a first compressing method, and the recording device records the audio information in a compressed state based on a second compressing method, which is different from the first compressing method, into the second information record medium According to this aspect, it is possible to convert the compressing method of the audio information in the compressed state and then speedily record the audio information into the second information record medium.

In another aspect of the third information recording and reproducing apparatus of the present invention, the controlling device controls the recording device so as to record information indicative of a portion of the audio information, which is being recorded at a time of stopping a recording operation of recording the audio information into the second information record medium, into the second information record medium and then stop the recording operation, when the recording operation is to be stopped in a middle of recording the audio information into the second information record medium.

According to this aspect, when the operation of recording the audio information into the second information record medium is resumed, it is possible to prevent the same portion of the audio information from being recorded redundantly into the second information record medium by resuming the recording operation on the basis of the information indicative of the portion.

In this aspect, the controlling device may control the recording device so as to output stop information indicative of stopping the recording operation to an external portion, when the recording operation is to be stopped in the middle.

By constituting in this manner, it is possible for the user to recognize the fact that the operation of recording the audio information is stopped.

Also in this aspect, the recording operation may be stopped by stopping a main electric power supplying device for supplying an electric power to the information recording and reproducing apparatus in a normal operation, and the information recording and reproducing apparatus may be further provided with a sub electric power supplying device for supplying an electric power to the information recording and reproducing apparatus after the main electric power supplying device is stopped.

By constituting in this manner, it is possible to perform outputting the information indicative of the portion or the stop information by continuing the supply of the electric power even if the operation of recording the audio information is stopped as the main electric power supply is stopped.

In another aspect of the third information recording and reproducing apparatus of the present invention, the apparatus is further provided with a compressing device for judging the audio information which is recorded in a non-compressed state from among the audio information recorded in the second information record medium, reproducing the judged audio information in the non-compressed state from the second information record medium, compressing the reproduced audio information by applying a predetermined compressing process onto the reproduced audio information, and recording again the compressed audio information into the second information record medium.

According to this aspect, even if the audio information is recorded in the non-compressed state in the first information record medium, it is possible to record the audio information into the second information record medium while saving the memory capacity of the second information record medium.

In another aspect of the third information recording and reproducing apparatus of the present invention, the first information record medium comprises an optical disc, such as a DIV audio disc or the like, and the second information record medium comprises a magnetic disc, such as a hard disc or the like.

According to this aspect, it is possible to speedily record the reproduced audio information.

In another aspect of the third information recording and reproducing apparatus of the present invention, on the second information record medium, map information to control a navigation function is further recorded, and the information recording and reproducing apparatus is further provided with a navigation device such as a CPU or the like, for controlling the navigation function by using the map information.

According to this aspect, the recording operation of the audio information and the navigation function using the map information can be performed by means of just one information record medium.

The above object of the present invention can be also achieved by a first information recording and reproducing method including: a first reproducing process of reproducing audio information from a first information record medium, such as a DVD audio disc or the like, in which the audio information is recorded; a recording process of recording the reproduced audio information into a second information record medium, such as a hard disc or the like; a second reproducing process of reproducing the audio information recorded in the second information record medium; and a controlling process of setting a recording speed when recording the audio information into the second information record medium and a reproducing speed when reproducing the audio information from the second information record medium such that the recording speed is equal to or higher than the reproducing speed, and controlling the second reproducing process and the recording process so as to perform reproducing the recorded audio information from the second information record medium at the set reproducing speed in parallel to recording the audio information into the second information record medium at the set recording speed.

According to the first information recording and reproducing method of the present invention, since the operation of recording the audio information into the second information record medium is performed at the recording speed, which is equal to or higher than the reproducing speed of the operation of reproducing the audio information from the second information record medium, it is possible to record the audio information speedily into the second information record medium while it is possible to reproduce the audio information from the second information record medium in parallel to this recording operation.

Thus, for example, it is possible to copy and record the audio information in a short time while reproducing the audio information within the moving vehicle.

The above object of the present invention can be also achieved by a second information recording and reproducing method including: a first reproducing process of reproducing audio information from a first information record medium, such as a DVD audio disc or the like, in which the audio information is recorded; a recording process of recording the reproduced audio information into a second information record medium, such as a hard disc or the like; a second reproducing process of reproducing the audio information recorded in the second information record medium; and a controlling process of controlling the recording process to record the audio information, which is reproduced from the first information record medium by the first reproducing process, when the audio information is outputted as a sound and also controlling the second reproducing process to reproduce and output the audio information as the sound According to the second information recording and reproducing method of the present invention, it is possible to record the audio information into the second information record medium while reproducing and outputting the audio information as the sound from the second information record medium.

The above object of the present invention can be also achieved by a third information recording and reproducing method including: a reproducing process of reproducing audio information from a first information record medium, in which the audio information is recorded; a recording process of recording the reproduced audio information into a second information record medium; and a controlling process of controlling the reproducing process and the recording process so as to perform recording the reproduced audio information into the second information record medium in parallel to reproducing the audio information from the first information record medium.

According to the third information recording and reproducing method of the present invention, since the operation of recording the audio information into the second information record medium is performed in parallel to the operation of reproducing the audio information from the first information record medium, it is possible to complete recording the audio information in a short time while the reproducing operation.

Thus, for example, it is possible to efficiently copy and record the audio information in a short time while reproducing the audio information within the moving vehicle.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. In the embodiment described below, the present invention is applied to an information recording and reproducing apparatus which is installed within a vehicle or car, and has an on-vehicle navigation function of navigating or guiding a movement of the vehicle while displaying a map and the like, and, while reproducing music information recorded in a CD or DVD audio disc, the apparatus can copy the music information to a hard disc in a hard disc device, within the vehicle.

(I) First Embodiment

At first, the configuration and the operation of the information recording and reproducing apparatus according to the present invention having the navigation function will be described below with reference to FIG. 1.

Figure 1:
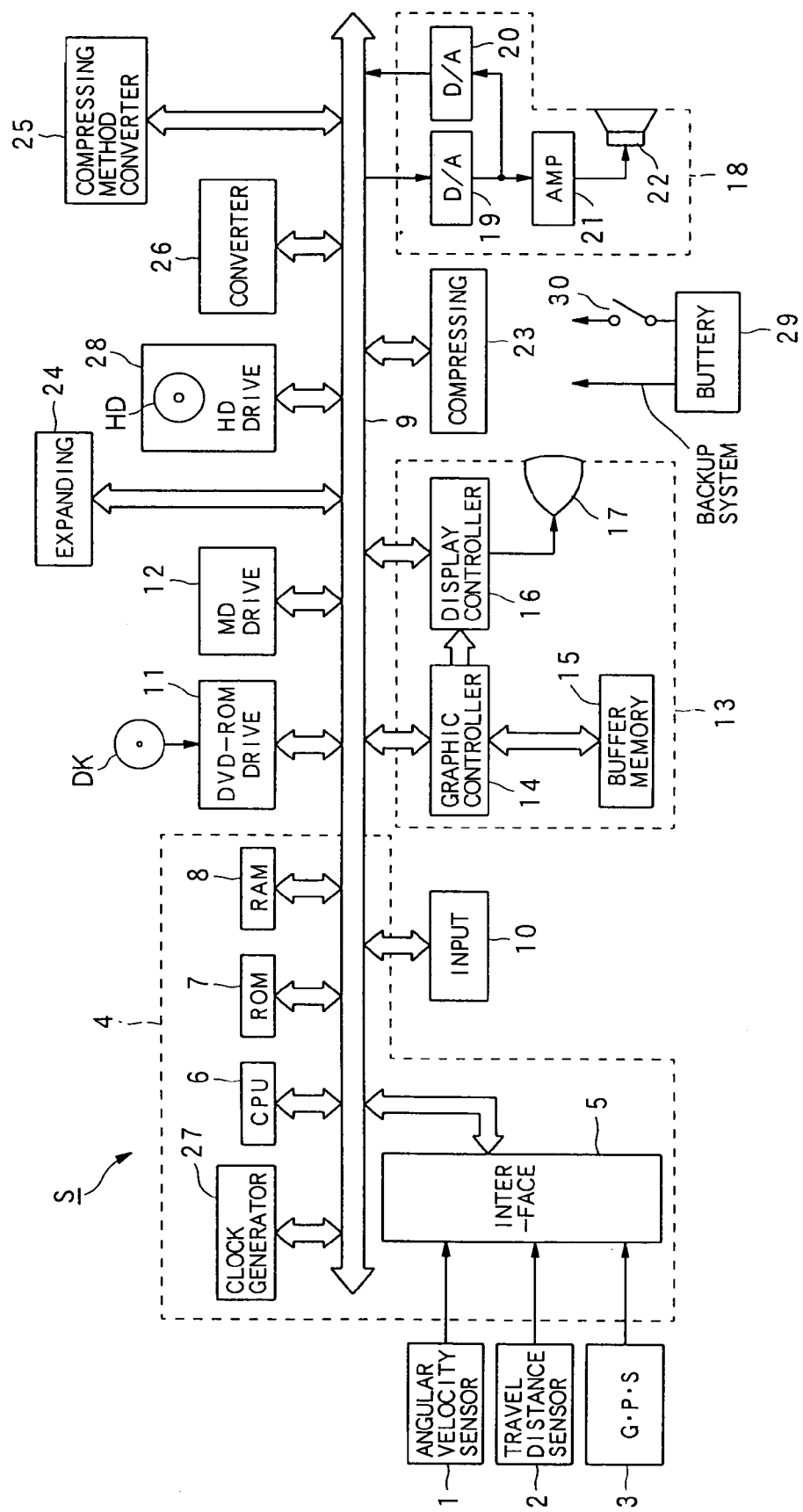
FIG. 1 is a block diagram showing a schematic configuration of an information recording and reproducing apparatus as an embodiment of the present invention.

FIG. 1 is a block diagram showing the schematic configuration of the information recording and reproducing apparatus.

As shown in FIG. 1, an information recording and reproducing apparatus S as the first embodiment is provided with: an angular velocity sensor 1 for detecting an angular velocity at a time of changing a direction of a self-vehicle and outputting an angular velocity data and a relative azimuth data; a travel distance sensor 2 for counting the number of pulses in a pulse signal outputted in conjunction with a rotation of a wheel, and thereby calculating the number of pulses per wheel rotation, and then outputting a travel distance data based on the number of pulses per rotation; a GPS receiver 3 for receiving an electric wave from a GPS (Global Positioning System) satellite, outputting a GPS measurement data, and then outputting an absolute azimuth data in a travel direction of the self-vehicle; a system controller 4 for detecting a position of the self-vehicle, controlling the navigation function and controlling the information recording and reproducing apparatus S as a whole; and an input device 10, such as a remote controller or the like, for inputting various data.

The information recording and reproducing apparatus S is provided with: a DVD-ROM drive 11 for reading out and outputting record information from a DVD-ROM or audio DVD disc DK; an MD (Mini Disc) drive 12 serving as one example of a first reproducing device for reading out and outputting the record information from an MD (not shown); a display device 13 for displaying various display data under a control of the system controller 4; an audio reproducing device 18 for reproducing and outputting various music information under the control of the system controller 4; a compressing device 23 for compressing (encoding) the music information reproduced by each drive by using, for example, an MPEG (Moving Picture Experts Group) method, an ATRAC (Adaptive Transform Acoustic Coding) or the like; an expanding device 24 for expanding (decoding) the compressed music information; a compressing method converter 25 serving as one example of a converting device for converting a compressing method in the music information; a converter 26 for converting the number of channels and a sampling frequency in the music information; an HD drive 28 serving as one example of a recording device and one example of a second reproducing device for recording the map information and the music information on a hard disc HD serving as another example of an information record medium of built-in type; and a battery 29 serving as one example of a main power supplying device and a sub-power supplying device for supplying a power supply to the above-mentioned respective constitutional elements.

The system controller 4 is provided with: an interface 5 for carrying out an interface operation with external sensors e.g., the angular velocity sensor 1, the travel distance sensor 2 and the GPS receiver 3 and the like; a CPU 6 serving as one example of a controller and one example of a navigation controller for controlling the system controller 4 as a whole; an ROM (Read Only Memory) 7 for storing a basic control program to control the system controller 4 and the like; an RAM (Random Access Memory) 8 including a non-volatile memory (not shown) and the like for storing (i) system setting information pre-set by a user through the input device 10 and (ii) identification information necessary for a later-described information recording and reproducing process in a condition that they can be read out; and a clock generator 27 for clocking a current time and the like in accordance with a time data from a GPS satellite especially received by the GPS receiver 3. The input device 10, the DVD-ROM drive 11, the MD drive 12, the display device 13, the audio reproducing device 18, the compressing device 23, the compressing method converter 25, the converter 26 and the HD drive 28 are connected through a communication bus line 9 to each other.

The display device 13 is provided with: a graphic controller 14 for controlling the entire display device 13, in accordance with control data sent from the CPU 6 through the bus line 9; a buffer memory 15, which may be a VRAM (Video RAM) or the like, for transiently storing instantly displayable picture information; and a display controller 16 for controlling a display of a display 17, such as a liquid crystal panel, a CRT (Cathode Ray Tube) or the like on the basis of video data outputted from the graphic controller 14.

The audio reproducing device 18 is provided with: a D/A (Digital to Analog) converter 19 for performing a D/A conversion of digital data (i.e., digital data for navigation or the above-mentioned music information) sent through the bus line 9 from the RAM 8, the DVD-ROM drive 11 or the like; an A/D converter 20 for again converting an analog signal outputted by the D/A converter 19 into the digital data; an amplifier 21 for amplifying the analog signal outputted by the D/A converter 19; and a speaker 22 for converting the amplified analog signal into a tone and outputting it.

The battery 29 supplies the power supplies of two systems i.e., a main power supply system supplied through a so-called ACC (Accessory) switch 30 and a backup system which is always connected and used to store an operation state of each constitutional element just before the ACC switch 30 is turned off (e.g., a music composition number of a final reproduced music composition when the music information is being reproduced from a DVD audio disc or an MD on which the music information composed of a plurality of music composition is recorded).

Here, when a DVD audio disc DK is mounted in the DVD-ROM drive 11, the DVD-ROM drive 11 serving as one example of a first reproducing device detects each music composition from the DVD audio disc DK, and also decodes and reproduces it, and then outputs through the bus line 9 to the compressing device 23, the HD drive 28 or the audio reproducing device 18.

Incidentally, the DVD-ROM drive 11 has the compatibility so that the reproduction can be done from a CD-ROM or a CD for recording music.

Here, in the information recording and reproducing apparatus S, when the navigation function is used, the map information recorded on the DVD-ROM disc is read out by using the DVD-ROM drive 11, and is outputted to the display 17 to thereby carry out a display process, a route guide process or a map matching process as the navigation function. Also the map information necessary for the navigation function is transferred and stored to a hard disc HD at a suitable timing. At this time, the transfer of the map information is performed for each map data block within a territory defined in accordance with a predetermined condition with a self-vehicle position as a standard.

Then, the map information once stored in the hard disc HD is maintained as it is, unless it is deleted. After that, the navigation function can be used by reading out the map information through the HD drive 28 from the hard disc HD instead of the DVD-ROM. Of course, the music information and the map information for the navigation can be both recorded in the hard disc HD.

Next, a process of reproducing and recording the information in the present invention for reproducing the music information (having a plurality of music compositions) recorded on the MD mounted in the MD drive 12 or on the DVD audio disc DK mounted in the DVD-ROM drive 11 and also a process of copying to the hard disc HD in the information recording and reproducing apparatus S shown in FIG. 1 will be described below with reference to FIG. 2.

Figure 2:
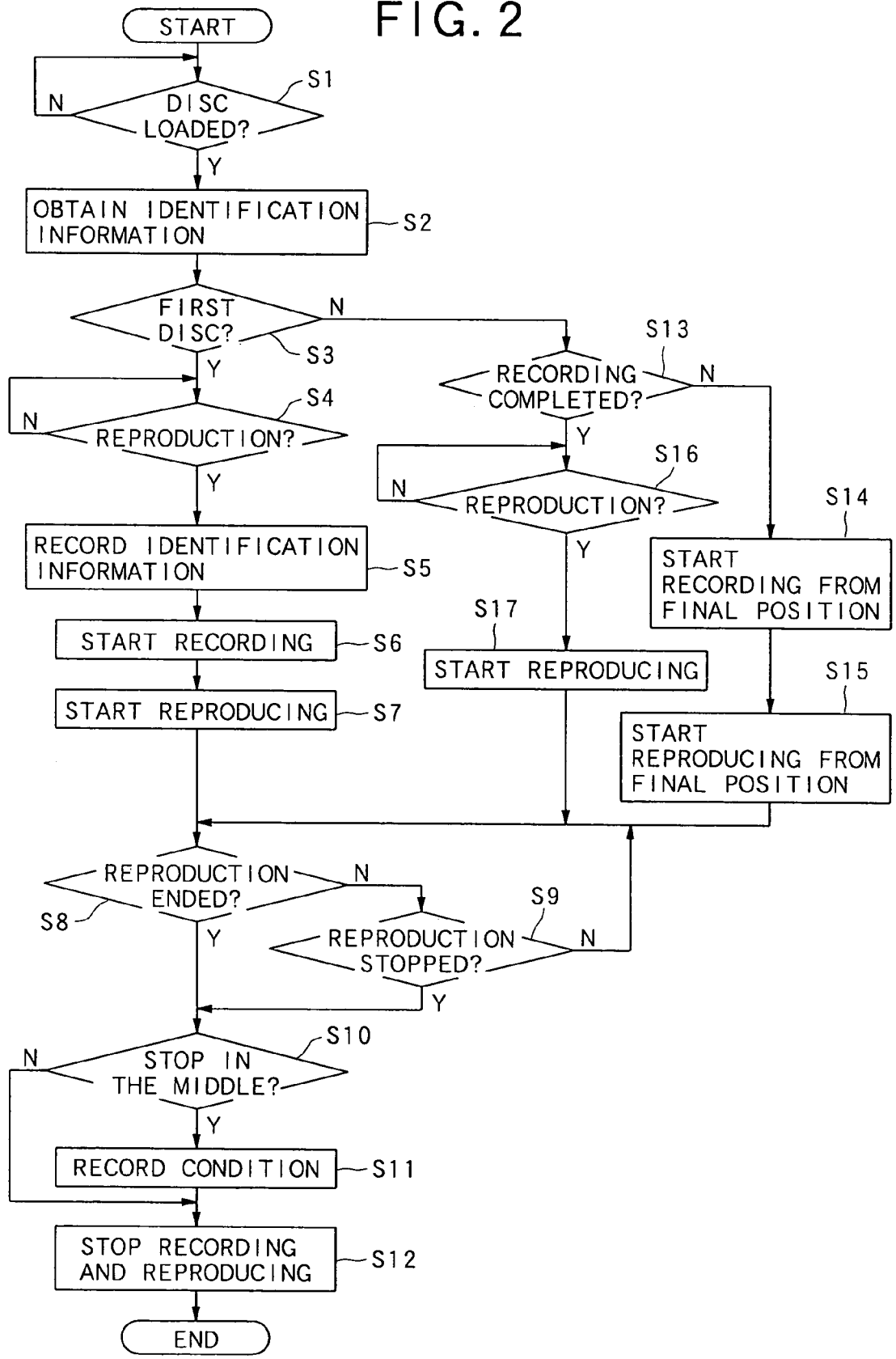
FIG. 2 is a flowchart showing a process for recording and reproducing information in to the embodiment.

FIG. 2 is a flowchart showing the information recording and reproducing process. Moreover, the information recording and reproducing process is mainly carried out in the CPU 6 in accordance with a program (which is stored in the ROM 7 in advance) corresponding to the flowchart shown in FIG. 2.

As shown in FIG. 2, in the information recording and reproducing process of the first embodiment, it is firstly judged whether or not the DVD audio disc DK or MD (hereafter, merely referred to as a disc DK) in which the music information is recorded is mounted in the DVD-ROM drive 11 or the MD drive 12 (Step S1).

If it is not mounted (Step S1; NO), the operational flow waits for the mount. If it is mounted (Step S1; YES), the identification information recorded on the disc DK is read out and is transiently stored in the RAM 8 (Step S2).

Here, the identification information actually implies the TOC (Table Of Contents) information in the recorded music information (in a case of the CD), the U-TOC (User-TOC) information (in a case of the MD), or the ID (identification) information to identify the DVD audio disc DK itself from another DVD audio disc or the like, serving as examples of content information of the respective music compositions.

Next, in accordance with the obtained identification information, it is judged whether or not the currently mounted disc DK is a disc DK for which music information recorded thereon is not copied to and recorded in the hard disc HD at all i.e., whether or not it is a firstly mounted disc (Step S3).

If the mounted disc DK is a disc DK for which the copy or record is not performed at all and then the reproduction is firstly performed (Step S3; YES), it is judged whether or not the start of the reproduction of the music information within the disc DK is instructed by the input device 10 (Step S4). If the reproduction start is not instructed (Step S4; NO), the operational flow waits for the instruction.

On the other hand, if the reproduction start is instructed in the judgment at the step S4 (Step S4; YES), the identification information stored in the RAM 8 at the step S2 is recorded through the HD drive 23 to the hard disc HD (Step S5).

Then, the detection of the music information recorded on the disc DK and the copy and record through the bus 9 and the HD drive 28 to the hard disc HD are started (Step S6). After that, the reproduction of the music information copied to and recorded in the hard disc HD and the output through the audio reproducing device 18 to the external portion are started in accordance with the content of the reproduction start instruction at the step S4 (Step S7).

That is, in the processes at the steps S6 and S7, while the music information is being recorded to the hard disc HD, the recorded music information is instantly reproduced from the hard disc HD.

As the method of copying and recording the music information to the hard disc HD at the step S6, there are many methods as described below. It is suitably selected by the CPU 6, on the basis of a kind of the information record medium, a compressing manner and the like. Also, the manner of the music information itself to be copied and recorded is converted into the following various manners, and is copied to and recorded in the hard disc HD.

(1-1) Case of Compressing Music Information and Copying to Hard Disc

In this case, when a music CD, on which non-compressed linear PCM (Pulse Code Modulation) music information is recorded, or a DVD audio disc DK, on which non-compressed music information (actually, a so-called "title" recorded by the linear PCM music information and the like), is firstly mounted in the DVD-ROM drive 11, the linear PCM music information is read by the DVD-ROM drive 11. Then, the read linear PCM music information is compressed by the compressing device 23 by using a compressing method, such as the ATRAC method, the MP 3 (MPEG Audio Layer 3) method or the like, is transferred through the bus line 9 to the HD drive 28, and is then recorded to the hard disc HD.

By the way, besides the method in which the linear PCM music information read out from the DVD-ROM drive 11 is compressed by the compressing device 23, it may be designed such that the analog signal outputted by the D/A converter 19 is converted into a digital signal by the A/D converter 20, is compressed by the compressing device 23 and is then recorded to the hard disc HD.

(1-2) Case of Expanding Compressed Music Information and Copying to Hard Disc

When the MD is mounted in the MD drive 12 or when the DVD audio disc DK (on which the compressed music information is recorded, while the DVD audio disc DK is designed to record thereon the non-compressed music information as well as the compressed music information according to the standard) is mounted in the DVD-ROM drive 11, the compressed music information reproduced by each drive is expanded by the expanding device 24.

The expanded music information is transferred through the bus line 9 to the HD drive 28 as the linear PCM music information, and is recorded to the hard disc HD.

By the way, besides the method of recording the linear PCM music information outputted by the expanding device 24 to the hard disc HD, it may be designed to record the digital signal, which is obtained by digitizing the analog signal outputted from the D/A converter 19 by the A/D converter 20, to the hard disc HD.

Here, the compressing methods for the MD and the DVD audio disc DK are different from each other. However, in the expanding device 24, the music information compressed by using the plurality of compressing methods can be expanded by a DSP (Digital Signal Processor).

(1-3) Case of Copying Compressed Music Information to Hard Disc

When the MD is mounted in the MD drive 12 or when the DVD audio disc DK (in which the compressed music information is recorded) is mounted in the DVD-ROM drive 11, the compressed music information reproduced in each drive is transferred through the bus line 9 to the HD drive 28, and is then recorded to the hard disc HD.

That is, the music information recorded in the MD or the DVD audio disc DK is recorded as it is to the hard disc HD.

(1-4) Case of Changing Compressing Method of Compressed Music Information and Copying to Hard Disc When the MD is mounted in the MD drive 12 or when the DVD audio disc DK (in which the compressed music information is recorded) is mounted in the DVD-ROM drive 11, the compressed music information reproduced in each drive is transferred through the bus line 9 to the compressing method converter 25 to accordingly convert its compressing method. In this case, if the reproduction target is the MD, the compressing method is converted from the ATRAC method (which is for the MD) into the MP 3 method.

Then, the compressed music information after the conversion of the compressing method is again transferred through the bus line 9 to the HD drive 28 and is then recorded to the hard disc HD.

(1-5) Case of Changing Number of Channels and Copying to Hard Disc

According to the above-mentioned standard with regard to the DVD audio disc DK, it is prescribed that the music information can be recorded onto the DVD audio disc DK in a multiple-channel of 5.1 channels. On the other hand, there may be a case that it does not correspond to the multiple-channel reproduction as the configuration of a vehicle itself (for example, the number of speakers within the vehicle).

In this case, it is necessary to reproduce by down-mixing the multiple-channel music information, for example, down to a two-channel stereo. This down-mixing process is carried out by the converter 26. At this time, the converter 26 is provided with a DSP and the like. The converter 26 mixes the music information of the respective channels in the above-mentioned multiple channels at a preset predetermined rate to then obtain, for example, the music information of the two-channel stereo.

Now, if a DVD audio disc DK (i.e., a DVD audio disc DK on which a multiple-channel music is recorded) is mounted in the DVD-ROM drive 11, the music information reproduced by the DVD-ROM drive 11 is transferred through the bus line 9 to the converter 26, and is converted into, for example, music information of a two-channel stereo. Then, it is again transferred through the bus line 9 to the HD drive 28, and is then recorded to the hard disc HD.

By the way, if there is an environment where the multiple-channel music information can be reproduced within the vehicle, it may be designed such that the music information on the DVD audio disc DK is recorded to the hard disc HD as it is as the multiple-channel and also the music information is reproduced from the hard disc HD, and is then outputted from the speaker 22 through the D/A converter 19 and the amplifier 21.

(1-6) Case of Converting Sampling Frequency and Copying to Hard Disc

In the above-mentioned standard with regard to the DVD audio disc DK, it is prescribed that the music information of a plurality of sampling frequencies, such as 96 KHz, 48 KHz or the like can be recorded on the DVD audio disc DK.

Here, the high sampling frequency increases the amount of the entire data. If such music information is recorded to the hard disc HD, this results in the wasteful usage of the capacity of the hard disc HD. So, in this case, it may be considered to record the music information to the hard disc HD after the sampling frequency is made lower to thereby reduce the data amount.

In this case, the music information reproduced from the DVD-ROM drive 11 in which the sampling frequency is, for example, 96 KHz is transferred through the bus line 9 to the converter 26, and is then converted into the music information in which the sampling frequency is, for example, 48 KHz. Then, the music information converted by the converter 26 is again transferred through the bus line 9 to the HD drive 28, and is then recorded to the hard disc HD.

The music information is copied to and recorded to the hard disc HD by using the above-mentioned various methods (Step S6).

The operation when the music information is copied to and recorded to the hard disc HD may be designed such that the copy and record are automatically started when the reproduction of the music information is started after mounting the disc DK, besides the configuration in which the copy and record are started after the instruction of the user in the input device 10.

By the way, the recording speed of the operation started at the step S6 when the music information is copied to the hard disc HD is equal to or faster than two times the reproducing speed from the hard disc HD of the copied music information started at the next step S7. Accordingly, it is possible to copy the music information while preventing the voice outputted from the audio reproducing device 18 from being interrupted.

Also, the reproduction from the hard disc HD started at the step S7 is actually carried out by the HD drive 28. However, at this time, if the music information recorded in the hard disc HD is compressed, the music information is reproduced and outputted after the expanding device 24 expands the music information. On the other hand, if the non-compressed music information is recorded in the hard disc HD, it is decoded as it is and is then outputted through the audio reproducing device 18 to the external portion as a tone.

At this time, since the expanding device 24 has the DSP as mentioned above, the expanding device 24 can carry out the expanding processes corresponding to respective one of the various compressing methods.

Next, it is judged whether or not all the music information recorded in the disc DK is completely copied to and recorded in the hard disc HD and the reproduction of all the music information recorded in the hard disc HD is ended (Step S8). If they are ended (Step S8; YES), the operational flow proceeds to the step S10 as it is. On the other hand, if they are not ended (Step S8; NO), as the ACC switch 30 is turned off (i.e., the vehicle is stopped and its engine is turned off), it is judged whether or not the copy and the reproduction are stopped before the end of the copy and the reproduction of all the music information within the disc DK (Step S9).

If they are not stopped before the end of the copy and the reproduction of all the music information within the disc DK (Step S9; NO), the operational flow returns back to the step S8 as it is. Then, the copy and the reproduction are continued. On the other hand, if the copy and the reproduction are stopped (i.e., the stop in the middle) as the ACC switch 30 is turned off (Step S9; YES), it is then checked whether or not such a situation that the copy and the reproduction are not performed because of "Step S8; YES" or "Step S9; YES" implies the stop of the copy and the reproduction (i.e., the stop in the middle) before the end of the copy to the hard disc HD of all the music information within the disc DK (Step S10). If they are stopped in the middle (Step S10; YES), the music composition which had been copied and reproduced immediately before the stop in the middle and the identification information to identify the disc DK mounted in the DVD-ROM drive 11 or the MD drive 12 are recorded to the hard disc HD (Step S11). The copy and the reproduction as well as the output of the music information currently being carried out are stopped (Step S12). Then, the information recording and reproducing process according to the first embodiment is ended.

By the way, the recording process at the step S11 is carried out by using the power supply supplied through the backup system from the battery 29.

On the other hand, in the judgment at the step S3, if the disc DK mounted in the DVD-ROM drive 11 or the MD drive 12 is the disc DK, with respect to which the above-mentioned copy and reproduction have been performed on at least some portion thereof (Step S3; NO), the identification information with regard to the disc DK recorded in the hard disc HD (refer to the step S11) is detected, and it is then judged whether or not all the music information recorded in the disc DK are copied to the hard disc HD (Step S13). If it is judged from the detected identification information that only a part of the music information is copied and that the reproduction and the output are not completed (Step S13 NO), the copy is started from the next music composition after a finally copied music composition (Step S14). Moreover, the reproduction from the hard disc HD of the copied music information from the next music composition after the finally copied music composition is started (Step S15). Then, the operational flow proceeds to the step S8.

On the other hand, in the judgment at the step S13, if it is judged from the detected identification information that all the music information are completely copied (Step S13; YES), it is then judged whether or not the starts of the reproduction and the output of the music information in the hard disc HD in which the copy has been completed are instructed by the input device 10 (Step S16). If the starts of the reproduction and the output are not instructed (Step S16; NO), the operational flow waits for the instruction. If they are instructed (Step S16; YES), the reproduction and the output are started in accordance with the content of the instruction (Step S17). Then, the operational flow proceeds to the step S8.

Then, the above-mentioned processes are repeated on and after the step S8.

Next, an example of an operation when the music information, which is copied the hard disc HD, is reproduced from the hard disc HD as mentioned above (i.e., when the hard disc HD is selected as the information record medium targeted for the reproduction) will be described below with reference to FIG. 3.

Figure 3:
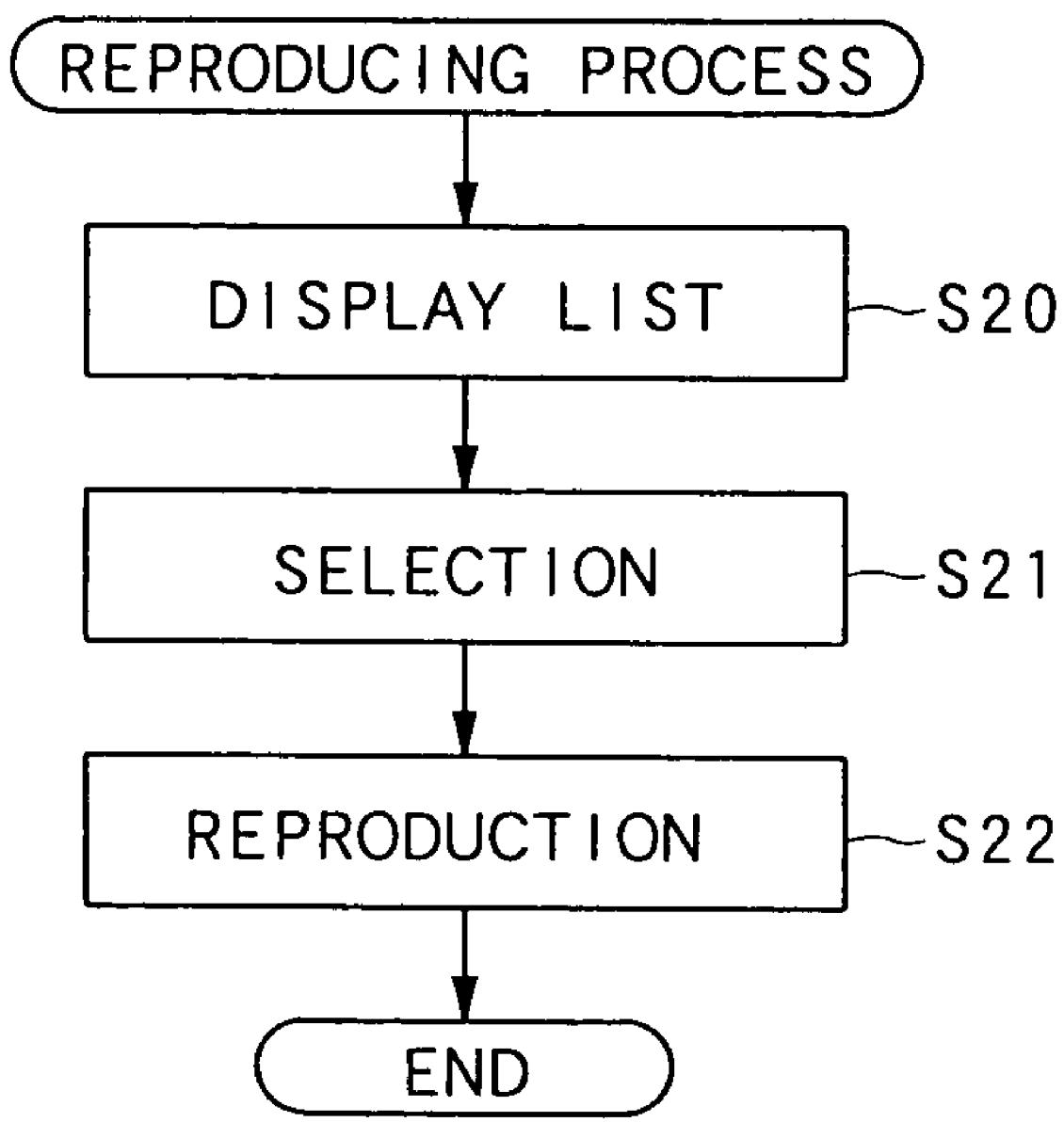
FIG. 3 is a flowchart showing an example of a process of reproducing the information in the embodiment.

FIG. 3 is a flowchart showing the operation of the reproducing process.

As shown in FIG. 3, in the reproducing process, when the hard disc HD is firstly selected by the input device 10 as the reproduction target, a list (table) indicative of the music information recorded in the hard disc HD is displayed on the display 17 (Step S20). Accordingly, the music information desired to be listened to is selected by the input device 10 on the basis of the list (Step S21).

Then, the selected music information (music composition) is read out from the hard disc HD by the HD drive 28. For example, if the read out music information is compressed, it is expanded by the expanding device 24. Then, the music information is reproduced through the D/A converter 19 and the like as the linear PCM music information (Step S22).

As mentioned above, according to the information recording and reproducing process of the first embodiment, the music information is recorded to the hard disc HD at the recording speed equal to or faster than the reproducing speed from the hard disc HD. Thus, the music information can be quickly copied to the hard disc HD, and the music information can be reproduced from the hard disc HD in parallel to the copy.

Also, since it is controlled such that the music information is recorded to the hard disc HD at the recording speed equal to or faster than two times the reproducing speed, while the music information can be further quickly recorded to the hard disc HD, this music information can be reproduced from the hard disc HD.

Moreover, when the operation of recording the music information to the hard disc HD is stopped, it is stopped after the identification information is recorded to the hard disc HD. So, when the operation of recording the music information to the hard disc HD is resumed, by resuming it in accordance with the identification information, it is possible to prevent the same music composition from being duplicated and recorded to the hard disc HD.

Furthermore, the interruption of recording the music information is induced as the ACC switch 30 is turned off. Also, even after the ACC switch 30 is turned off, the power supply is supplied from the battery 29. Thus, even if the copy of the music information is interrupted as the ACC switch 30 is turned off, it is possible to continue the supply of the power supply to then record the identification information.

Also, the music information is copied to the hard disc HD and is reproduced. Thus, the music information can be copied at a high speed.

Moreover, in the information recording and reproducing apparatus S, while the music information can be being recorded to the hard disc HD in a short time, it can be being reproduced and outputted.

By the way, the following configuration may be designed in case that the non-compressed linear PCM music information is recorded on the disc DK or the music CD, if it is copied to the hard disc HD. That is, it is once copied to the hard disc HD in a non-compressed state. Then, when a series of copies, reproductions and outputs is ended, the recorded music information is read out from the hard disc HD. After this read out music information is compressed by the compressing device 23, it is again recorded to the hard disc HD.

In this case, since (i) the recorded non-compressed music information is read out from the hard disc HD, (ii) the read out music information is compressed, and (iii) the compressed music information is again recorded to the hard disc HD, even if the music information in the non-compressed state is recorded on the disc DK, it is possible to copy the music information while saving the record capacity of the hard disc HD.

Moreover, when the music information is recorded from the disc DK to the hard disc HD, the recording in the hard disc HD may be limited, by referring to a so-called "copy guard signal" (i.e., an illegal copy protection signal) buried in the music information.

In the above-mentioned first embodiment, the case is described in which the recording speed when the music information is copied to the hard disc HD is set at the high speed i.e., the speed equal to or faster than two times the reproducing and outputting speed from the hard disc HD. However, otherwise, it may be designed such that the reproducing and outputting speed is set to be equal to the recording speed and then the reproduction of the music information from the hard disc HD is started from a timing later than that of the start of recording.

This configuration enables the copied music information to be reproduced from the hard disc HD without any interruption, according to the first embodiment.

(II) Modified Embodiment of First Embodiment

A modified embodiment of the first embodiment of the present invention will be described below with reference to FIG. 4.

Figure 4:
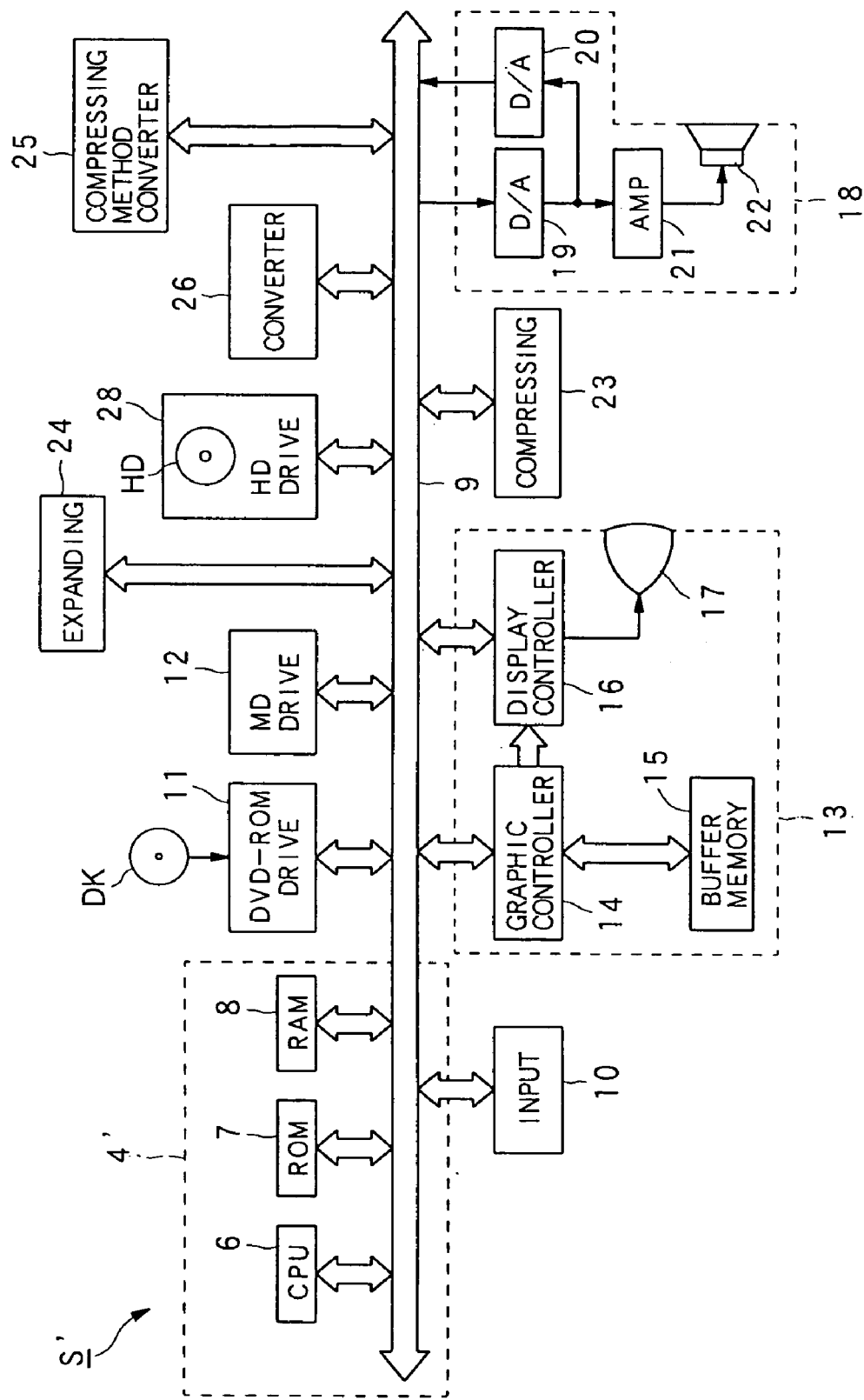
FIG. 4 is a block diagram showing a schematic configuration of an information recording and reproducing apparatus as a modified embodiment of the first embodiment.

FIG. 4 is a block diagram showing the schematic configuration of an information recording and reproducing apparatus as the modified embodiment of the first embodiment.

In the above-mentioned first embodiment, the case is described in which the present invention is applied to the information recording and reproducing apparatus S installed within the vehicle. However, besides it, the present invention can be applied to an information recording and reproducing apparatus for reproducing and outputting the music information after copying the music information, while coping the music information, which is recorded on a DVD audio disc DK, to a hard disc HD in a typical house.

That is, as shown in FIG. 4, an information recording and reproducing apparatus S' as the modified embodiment of the first embodiment is provided with a system controller 4' containing a CPU 6, an ROM 7 and an RAM 8 which are similar to those of the first embodiment, an input device 10, a DVD-ROM drive 11, an MD drive 12, a display device 13, an audio reproducing device 18, an expanding device 24, a compressing method converter 25, a converter 26 and an HD drive 28.

Here, a power supply is supplied from a so-called domestic receptacle to the above-mentioned respective constitutional elements. The power supply is supplied in succession even if a main power supply switch of the information recording and reproducing apparatus S' itself is turned off.

Then, an information recording and reproducing process similar to the first embodiment shown in FIG. 2 is mainly carried out by the system controller 4', the DVD-ROM drive 11, the compressing device 23, the HD drive 28 and the audio reproducing device 18.

By the way, at a step S11 of FIG. 2 in this modified embodiment, in addition to the above-mentioned original process of recording the identification information, it may be designed to display (i) information indicating that the main power supply switch of the information recording and reproducing apparatus S' itself is turned off, (ii) a warning message for warning that the power supply should be turned off, (iii) a name of a music composition (or a music composition number) for which the copy and the reproduction have been ended until that time, and the like, as character information by using the display device 13. At this time, the power supply supplied from the domestic receptacle is used as the power supply for the display after the main power supply switch is turned off.

Incidentally, it may be designed such that the supply of the power supply is not turned off immediately after the main power supply switch is turned off as mentioned above, and that the supply of the power supply is turned off after a preset so-called "power supply cutting process" is completed.

That is, it may be designed so as to cut off the supply of the power supply to the information recording and reproducing apparatus S', after the process at the step S11 of FIG. 2 is completed, if the fact that the main power supply switch is turned off is detected at the step S10 of FIG. 2 in this modified embodiment (Step S10; YES).

According to the modified embodiment of the first embodiment, in addition to the above-mentioned effects of the first embodiment, when the operation for coping and recording the music information to and in the hard disc HD and reproducing it is interrupted, the information indicative of the interruption is displayed as the character information. Thus, the occurrence of the interruption can be easily recognized.

(III) Second Embodiment

Next, a second embodiment of the present invention is explained with reference to FIG. 5.

The hardware configuration of the second embodiment is the same as that of the first embodiment shown in FIG. 1, and the explanations thereof are omitted. The process of reproducing and recording the information in the second embodiment is different from that of the first embodiment, and the explanations thereof are done hereinbelow.

Figure 5:
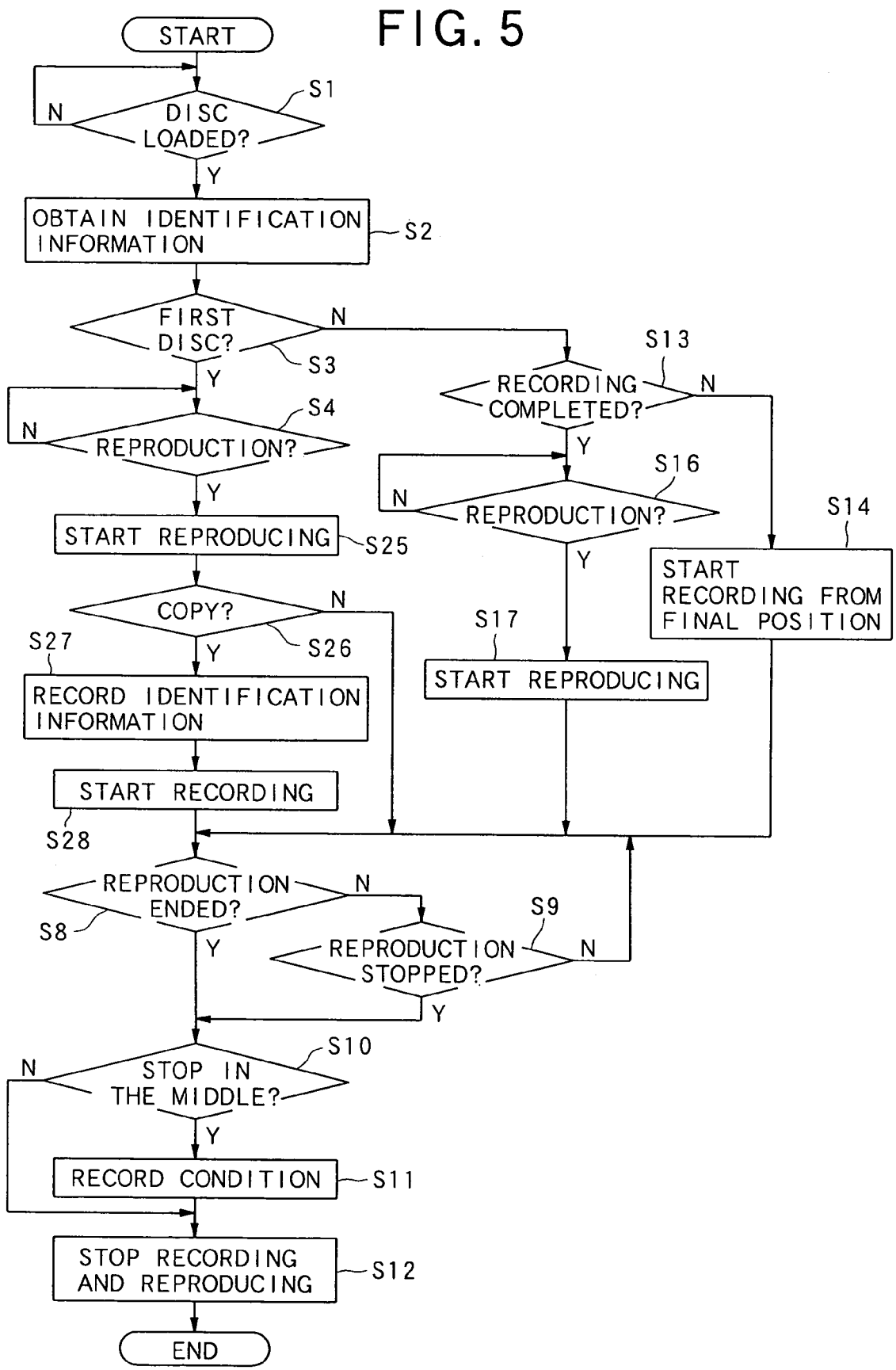
FIG. 5 is a flowchart showing a process for recording and reproducing information in to a second embodiment of the present invention.

FIG. 5 is a flowchart showing the information recording and reproducing process in the second embodiment. In FIG. 5, the same steps as those in FIG. 2 of the first embodiment carry the same step numbers, and the explanations thereof are omitted. Moreover, the information recording and reproducing process is mainly carried out in the CPU 6 in accordance with a program (which is stored in the ROM 7 in advance) corresponding to the flowchart shown in FIG. 5.

In the second embodiment, the music information (having a plurality of music compositions) recorded on the MD mounted in the MD drive 12 or on the DVD audio disc DK mounted in the DVD-ROM drive 11 is reproduced and is copied to the hard disc HD in the information recording and reproducing apparatus S shown in FIG. 1.

As shown in FIG. 5, at first, the processes at the steps S1 to S4 are performed.

Then, in the second embodiment, if the reproduction start is instructed in the judgment at the step S4 (Step S4; YES), the output to the external portion is started by using the audio reproducing device 18 in accordance with the content of this instruction (step S25).

Here, the reproduction is executed by expanding the music information at the expanding device 24 in case that the compressed music information is recorded on the DVD audio disc DK. On the other hand, in case that the non-compressed music information is recorded, the music information is decoded as it is and is then reproduced. At this time, the expanding device 24 is constituted by a DSP (Digital Signal Processor), so as to perform the expanding process with respect to various kinds of compressing methods.

Then, it is judged whether or not it is instructed to copy the reproduced music information to the hard disc HD by the input device 10 (step S26).

The operation when the music information is copied to and recorded to the hard disc HD may be designed such that the copy and record are automatically started when the reproduction of the music information is started after mounting the disc DK, besides the configuration in which the copy and record are started after the instruction of the user in the input device 10.

Then, if the copy is not instructed (step S26; NO), the operation flow branches to the step S8 as it is. On the other hand, if the copy is instructed (step S26: YES), the identification information, which has been stored in the RAM 8 at the step S2 is stored to the hard disc HD through the HD drive 28 (step S27). Then, the operation of copying the reproduced music information to the hard disc HD through the DVD-ROM drive 11, the bus 9 and the HD drive 28 is started (step S28).

As the method of copying and recording the music information to the hard disc HD here, there are many methods as described below. It is suitably selected by the CPU 6, on the basis of a kind of the information record medium, a compressing manner and the like. Also, the manner of the music information itself to be copied and recorded is converted into the following various manners, and is copied to and recorded in the hard disc HD.

(2-1) Case of Compressing Music Information and Copying to Hard Disc

In this case, when a music CD, on which non-compressed linear PCM (Pulse Code Modulation) music information is recorded, or a DVD audio disc DK, on which non-compressed music information (actually, a so-called "title" recorded by the linear PCM music information and the like), is firstly mounted in the DVD-ROM drive 11, the linear PCM music information is read by the DVD-ROM drive 11. Then, the read linear PCM music information is outputted from the speaker 22 through the D/A converter 19 and the amplifier 21.

Along with this operation, the linear PCM music information which is read by the DVD ROM drive 11 is compressed by the compressing device 23 by using a compressing method, such as the ATRAC method, the MP 3 (MPEG Audio Layer 3) method or the like, is transferred through the bus line 9 to the HD drive 28, and is then recorded to the hard disc HD.

By the way, besides the method in which the linear PCM music information read out from the DVD-ROM drive 11 is compressed by the compressing device 23, it may be designed such that the analog signal outputted by the D/A converter 19 is converted into a digital signal by the A/D converter 20, is compressed by the compressing device 23 and is then recorded to the hard disc HD.

(2-2) Case of Expanding Compressed Music Information and Copying to Hard Disc

When the MD is mounted in the MD drive 12 or when the DVD audio disc DK (on which the compressed music information is recorded, while the DVD audio disc DK is designed to record thereon the non-compressed music information as well as the compressed music information according to the standard) is mounted in the DVD-ROM drive 11, the compressed music information reproduced by each drive is expanded by the expanding device 24.

Then, the expanded music information becomes the linear PCM music information and is then outputted from the speaker 22 through the D/A converter 19 and the amplifier 21.

Along with this operation, the linear PCM music information outputted from the expanding device 24 is transferred through the bus line 9 to the HD drive 28 and is then recorded to the hard disc HD.

By the way, besides the method of recording the linear PCM music information outputted by the expanding device 24 to the hard disc HD, it may be designed to record the digital signal, which is obtained by digitizing the analog signal outputted from the D/A converter 19 by the A/D converter 20, to the hard disc HD.

Here, the compressing methods for the MD and the DVD audio disc DK are different from each other. However, in the expanding device 24, the music information compressed by using the plurality of compressing methods can be expanded by the above mentioned DSP.

(2-3) Case of Expanding Compressed Music Information, Re-Compressing and Recording it to Hard Disc In case that the MD is mounted in the MD drive 12 or the DVD audio disc DK is mounted in the DVD-ROM drive 1 (in which the compressed music information is recorded), the compressed audio information reproduced by each drive is expanded by the expanding device 24.

Then, the expanded music information becomes the linear PCM music information and is outputted from the speaker 22 through the D/A converter 19 and the amplifier 21.

Along with this operation, the linear PCM music information outputted from the expanding device 24 is compressed by the compressing method such as the ATRAC method, the MP3 method or the like by the compressing device 23, and is transferred through the bus line 9 to the HD drive 28 and is then recorded to the hard disc HD.

By the way, besides the method of compressing the linear PCM music information, which has been expanded by the expanding device 24, by the compressing device 23, it may be designed to firstly convert the analog signal outputted from the D/A converter 19 to the digital signal and then compress the digital signal by the compressing device 23.

(2-4) Case of Recording Compressed Music Information to Hard Disc

In case that the MD is mounted in the MD drive 12 or the DVD audio disc DK is mounted in the DVD-ROM drive 1 (in which the compressed music information is recorded), the compressed audio information reproduced by each drive is expanded by the expanding device 24.

Then, the expanded music information becomes the linear PCM music information and is outputted from the speaker 22 through the D/A converter 19 and the amplifier 21.

Along with this operation, the compressed music information outputted from the MD drive 12 or the DVD-ROM drive 11 is transferred through the bus line 9 to the HD drive 28, and is then recorded to the hard disc HD. Namely, the music information recorded on the MD or the DVD audio disc is recorded to the hard disc HD as it is.

(2-5) Case of Changing Compressing Method of Compressed Music Information and Copying to Hard Disc When the MD is mounted in the MD drive 12 or when the DVD audio disc DK (in which the compressed music information is recorded) is mounted in the DVD-ROM drive 11, the compressed music information reproduced in each drive is expanded by the expanding device 24.

Then, the expanded music information becomes the linear PCM music information and is outputted from the speaker 22 through the D/A converter 19 and the amplifier 21.

Along with this operation, the compressed music information outputted from the MD drive 12 or the DVD-ROM drive 11 is transferred through the bus line 9 to the compressing method converter 25, so as to convert the converting method. In this case, if the reproduction target is the MD, the ATRAC method for the MD is changed to the MP3 method for example.

Then, the compressed music information after the conversion of the compressing method is again transferred through the bus line 9 to the HD drive 28 and is then recorded to the hard disc HD.

(2-6) Case of Changing Number of Channels and Copying to Hard Disc

According to the above-mentioned standard with regard to the DVD audio disc DK, it is prescribed that the music information can be recorded onto the DVD audio disc DK in a multiple-channel of 5.1 channels. On the other hand, there may be a case that it does not correspond to the multiple-channel reproduction as the configuration of a vehicle itself (for example, the number of speakers within the vehicle).

In this case, it is necessary to reproduce by down-mixing the multiple-channel music information, for example, down to a two-channel stereo. This down-mixing process is carried out by the converter 26. At this time, the converter 26 is provided with a DSP and the like. The converter 26 mixes the music information of the respective channels in the above-mentioned multiple channels at a preset predetermined rate to then obtain, for example, the music information of the two-channel stereo.

Now, if a DVD audio disc DK (i.e., a DVD audio disc DK on which a multiple-channel music is recorded) is mounted in the DVD-ROM drive 11, the music information reproduced by the DVD-ROM drive 11 is transferred through the bus line 9 to the converter 26, and is converted into, for example, music information of a two-channel stereo. Then, it is outputted from the speaker 22 through the D/A converter 19 and the amplifier 21.

Along with this operation, the music information of the two-channel stereo is again transferred to the HD drive 28 through the bus line 9 and is recorded to the hard disc HD.

By the way, if there is an environment where the multiple-channel music information can be reproduced within the vehicle, it may be designed such that the music information on the DVD audio disc DK is outputted from the speaker 22 as it is as the multiple-channel while the music information of the two-channel stereo is recorded to the hard disc HD. In this case, the music information of the multiple channel reproduced from the DVD-ROM 11 is outputted from the speaker 22 through the D/A converter 19 and the amplifier 21.

(2-7) Case of Converting Sampling Frequency and Copying to Hard Disc

In the above-mentioned standard with regard to the DVD audio disc DK, it is prescribed that the music information of a plurality of sampling frequencies, such as 96 KHz, 48 KHz or the like can be recorded on the DVD audio disc DK.

Here, the high sampling frequency increases the amount of the entire data. If such music information is recorded to the hard disc HD, this results in the wasteful usage of the capacity of the hard disc HD. So, in this case, it may be considered to record the music information to the hard disc HD after the sampling frequency is made lower to thereby reduce the data amount.

In this case, the music information reproduced from the DVD-ROM drive 11 in which the sampling frequency is, for example, 96 KHz is outputted from the speaker 22 through the D/A converter 19 and the amplifier 21, while the music information in which the sampling frequency is 96 KHz is transferred through the bus line 9 to the converter 26, and is then converted into the music information in which the sampling frequency is, for example, 48 KHz. Then, the music information converted by the converter 26 is transferred through the bus line 9 to the HD drive 28, and is then recorded to the hard disc HD.

When the copy of the music information to the hard disc HD by the above mentioned various methods is completed, the processes at the step S8 to S12 are performed in the same manner as the first embodiment of FIG. 2.

On the other hand, in the judgment at the step S3, if the disc DK mounted in the DVD-ROM drive 11 or the MD drive 12 is the disc DK, with respect to which the above-mentioned copy and reproduction have been performed on at least some portion thereof (Step S3; NO), the processes at the step S13, S14, S16 and S17 are performed in the same manner as the first embodiment of FIG. 2 except that the step S15 is not performed since the reproduction is performed at the step S25 in the second embodiment.

In the second embodiment, the operation when the music information, which is copied the hard disc HD, is reproduced from the hard disc HD is the same as that of the first embodiment of FIG. 3.

As mentioned above, according to the information recording and reproducing process of the second embodiment, since the operation of recording the music information to the hard disc HD is performed along with the reproduction and output of the music information from the disc DK, it is possible to complete copying the music information within a short time period while outputting the music information.

The music information is compressed and recorded on the disk DK, the music information is expanded and decoded, this expanded music information is compressed and recorded to the hard disc HD. Thus, it is possible to record the music information to the hard disc HD while outputting the music information having a large information amount to the external portion.

Further, when the operation of recording the music information to the hard disc HD is stopped, the identification information indicative of the disc DK itself and the finally recorded music composition is recorded to the hard disc DK before actually stopping the recording operation. Thus, when the operation of recording the music information to the hard disc HD is resumed, it is possible to prevent the same music composition from being redundantly recorded, by resuming the recording operation in accordance with the identification information.

Also, since the music information is copied to the hard disc HD, the music information can be copied at a high speed.

Moreover, in the information recording and reproducing apparatus S, while the music information can be being reproduced and outputted, the music information can be recorded to the hard disc HD in a short time.

By the way, the following configuration may be designed in case that the non-compressed linear PCM music information is recorded on the disc DK or the music CD, if it is copied to the hard disc HD. That is, it is once copied to the hard disc HD in a non-compressed state. Then, when a series of copies is ended, the recorded music information is read out from the hard disc HD. After this read out music information is compressed by the compressing device 23, it is again recorded to the hard disc HD.

Moreover, when the music information is recorded from the disc DK to the hard disc HD, the recording in the hard disc HD may be limited, by referring to a so-called "copy guard signal" (i.e., an illegal copy protection signal) buried in the music information, according to the second embodiment.

(IV) Modified Embodiment of Second Embodiment

The second embodiment of the present invention may be modified in the same manner as the modified embodiment of the first embodiment explained with reference to FIG. 4. Namely, the second embodiment of the present invention can be applied to an information recording and reproducing apparatus for copying the music information, which is recorded on a DVD audio disc DK, to a hard disc HD in a typical house.

According to the modified embodiment of the second embodiment, in addition to the above-mentioned effects of the second embodiment, when the operation for coping and recording the music information to and in the hard disc HD is interrupted, the information indicative of the interruption is displayed as the character information. Thus, the occurrence of the interruption can be easily recognized.

In addition, in the first embodiment and the second embodiment as well as their modified embodiments, the case is described in which the music information is copied from the disc DK for recording the music information to the hard disc HD. However, besides it, the information recording and reproducing process in the present invention can be applied as it is to such a case that video information is copied from a DVD for recording the video information containing a dynamic picture and the like to the hard disc HD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No.11-328368 filed on Nov. 18, 1999 and No.11-336194 filed on Nov. 26, 1999 including the specification, claims, drawings and summary are incorporated herein by reference in its entirety.

What is claimed is:

1. An information recording and reproducing apparatus comprising:
    a first reproducing device for reproducing audio information from a first information record medium, in which the audio information is recorded;
    a recording device for recording the reproduced audio information into a second information record medium in which random access is possible;
    a second reproducing device for reproducing the audio information recorded in said second information record medium; and
    a controlling device for setting a recording speed when recording the audio information into said second information record medium and a reproducing speed when reproducing the audio information from said second information record medium such that the recording speed is equal to or higher than the reproducing speed, and controlling said second reproducing device and said recording device so as to simultaneously record a portion of said audio information to said second information record medium at the set recording speed and reproduce another portion of said audio information by reproducing said another portion of said audio information from said second recording medium at the set reproducing speed,
    wherein said controlling device controls said recording device so as to record information indicative of the portion of the audio information, which is being recorded at a time of stopping a recording operation of recording the audio information into said second information record medium, into said second information record medium and then stop the recording operation, when the recording operation is to be stopped in a middle of recording the audio information into said second information record medium.

2. An information recording and reproducing apparatus according to claim 1, wherein said controlling device controls said recording device so as to output stop information indicative of stopping the recording operation when the recording operation is to be stopped in the middle.

3. An information recording and reproducing apparatus according to claim 1, wherein
    the recording operation is stopped by stopping a main electric power supplying device for supplying an electric power to said information recording and reproducing apparatus in a normal operation, and
    said information recording and reproducing apparatus further comprises a sub electric power supplying device for supplying an electric power to said information recording and reproducing apparatus after said main electric power supplying device is stopped.

4. An information recording and reproducing apparatus comprising:
    a first reproducing device for reproducing audio information from a first information record medium, in which the audio information is recorded;
    a recording device for recording the reproduced audio information into a second information record medium;
    a second reproducing device for reproducing the audio information recorded in said second information record medium; and
    a controlling device for setting a recording speed when recording the audio information into said second information record medium and a reproducing speed when reproducing the audio information from said second information record medium such that the recording speed is equal to or higher than the reproducing speed, and controlling said second reproducing device and said recording device so as to perform reproducing the recorded audio information from said second information record medium at the set reproducing speed in parallel to recording the audio information into said second information record medium at the set recording speed, further comprising a compressing device for reproducing the recorded audio information from said second information record medium, compressing the reproduced audio information, and recording again the compressed reproduced audio information into said second information record medium.

5. An information recording and reproducing apparatus according to claim 4, wherein random access of said second information record medium is possible.

6. An information recording and reproducing apparatus comprising:
a first reproducing device for reproducing audio information from a first information record medium, in which the audio information is recorded;
a recording device for recording the reproduced audio information into a second information record medium;
a second reproducing device for reproducing the audio information recorded in said second information record medium; and
a controlling device for setting a recording speed when recording the audio information into said second information record medium and a reproducing speed when reproducing the audio information from said second information record medium such that the recording speed is equal to or higher than the reproducing speed, and controlling said second reproducing device and said recording device so as to simultaneously record a portion of said audio information to said second information record medium at the set recording speed and reproduce another portion of said audio information by reproducing said another portion of said audio information from said second recording medium at the set reproducing speed,
wherein
on said second information record medium, map information including map data of at least one territory to control a navigation function for a vehicle is further recorded,
said information recording and reproducing apparatus further comprises a navigation device for controlling the navigation function by using the map information, and
said second reproducing device reproduces the map information during the recording of said audio information by said recording device.

7. An information recording and reproducing apparatus comprising:
a reproducing device for reproducing audio information from a first information record medium, in which the audio information is recorded;
a recording device for recording the reproduced audio information into a second information record medium; and
a second reproducing device for reproducing the audio information recorded in said second information record medium; and
a controlling device for controlling said reproducing device and said recording device so as to simultaneously record a portion of said audio information to said second information record medium at the set recording speed and reproduce another portion of said audio information by reproducing said another portion of said audio information from said second recording medium at the set reproducing speed,
wherein
the audio information is recorded in said first information record medium in a compressed state based on a first compressing method,
said recording device records the audio information in a compressed state based on a second compressing method, which is different from the first compressing method, into said second information record medium, and
the audio information is reproduced from said second information record medium and recorded on said second information recording medium at the same time.

8. An information recording and reproducing apparatus comprising:
a reproducing device for reproducing audio information from a first information record medium, in which the audio information is recorded;
a recording device for recording the reproduced audio information into a second information record medium in which random access is possible; and
a controlling device for controlling said reproducing device and said recording device so as to simultaneously record a portion of said audio information to said second information record medium at the set recording speed and reproduce another portion of said audio information by reproducing said another portion of said audio information from said second recording medium at the set reproducing speed,
wherein said controlling device controls said recording device so as to record information indicative of the portion of the audio information, which is being recorded at a time of stopping a recording operation of recording the audio information into said second information record medium, into said second information record medium and then stop the recording operation, when the recording operation is to be stopped in a middle of recording the audio information into said second information record medium.

9. An information recording and reproducing apparatus according to claim 8, wherein said controlling device controls said recording device so as to output stop information indicative of stopping the recording operation when the recording operation is to be stopped in the middle.

10. An information recording and reproducing apparatus according to claim 8, wherein
the recording operation is stopped by stopping a main electric power supplying device for supplying an electric power to said information recording and reproducing apparatus in a normal operation, and
said information recording and reproducing apparatus further comprises a sub electric power supplying device for supplying an electric power to said information recording and reproducing apparatus after said main electric power supplying device is stopped.

11. An information recording and reproducing apparatus comprising:
a reproducing device for reproducing audio information from a first information record medium, in which the audio information is recorded;
a recording device for recording the reproduced audio information into a second information record medium; and a controlling device for controlling said reproducing device and said recording device so as to perform recording the reproduced audio information into said second information record medium in parallel to reproducing the audio information from said first information record medium, further comprising a compressing device for judging the audio information which is recorded in a non-compressed state from among the audio information recorded in said second information record medium, reproducing the judged audio information in the non-compressed state from said second information record medium, compressing the reproduced audio information by applying a predetermined compressing process onto the reproduced audio information, and recording again the compressed audio information into said second information record medium.

12. An information recording and reproducing apparatus according to claim 11, wherein random access of said second information record medium is possible.

13. An information recording and reproducing apparatus comprising:

a reproducing device for reproducing audio information from a first information record medium, in which the audio information is recorded;

a recording device for recording the reproduced audio information into a second information record medium;

a second reproducing device for reproducing the audio information recorded in said second information record medium; and a controlling device for controlling said reproducing device and said recording device so as to simultaneously record a portion of said audio information to said second information record medium at the set recording speed and reproduce another portion of said audio information by reproducing said another portion of said audio information from said second recording medium at the set reproducing speed, wherein on said second information record medium, map information including map data of at least one territory to control a navigation function for a vehicle is further recorded, said information recording and reproducing apparatus further comprises a navigation device for controlling the navigation function by using the map information, and said second reproducing device reproduces the map information during the recording of said audio information by said recording device.

14. An information recording and reproducing apparatus comprising:

a first reproducing device for reproducing audio information from a first information record medium, in which the audio information is recorded;

a recording device for recording the reproduced audio information into a second information record medium in which random access is possible;

a second reproducing device for reproducing the audio information recorded in said second information record medium; and a controlling device for setting a recording speed when recording the audio information into said second information record medium and a reproducing speed when reproducing the audio information from said second information record medium such that the recording speed is equal to or higher than the reproducing speed, controlling said second reproducing device and said recording device so as to simultaneously record a portion of said audio information to said second information record medium at the set recording speed and reproduce another portion of said audio information by reproducing said another portion of said audio information from said second recording medium at the set reproducing speed, and controlling said first reproducing device reproducing a recorded non-compressed information faster than normal speed in parallel to recording a compressed information which are converted from the non-compressed information by a compressing device.

15. An information recording and reproducing apparatus comprising:

a first reproducing device for reproducing audio information from a first information record medium, in which the audio information is recorded;

a recording device for recording the reproduced audio information into a second information record medium in which random access is possible;

a second reproducing device for reproducing the audio information recorded in said second information record medium; and a controlling device for setting a recording speed when recording the audio information into said second information record medium and a reproducing speed when reproducing the audio information from said second information record medium such that the recording speed is equal to or higher than the reproducing speed, controlling said second reproducing device and said recording device so as to simultaneously record a portion of said audio information to said second information record medium at the set recording speed and reproduce another portion of said audio information by reproducing said another portion of said audio information from said second recording medium at the set reproducing speed, and controlling said first reproducing device reproducing a recorded compressed information faster than normal speed in parallel to recording a compressed information which are converted from the recorded compressed information by a compressing method converter.

16. An information recording and reproducing apparatus comprising:

a first reproducing device for reproducing audio information from a first information record medium, in which the audio information is recorded;

a recording device for recording the reproduced audio information into a second information record medium in which random access is possible;

a second reproducing device for reproducing the audio information recorded in said second information record medium; and a controlling device for controlling said first reproducing device and said second reproducing device to simultaneously reproduce said audio information in a non-compressed form from said first reproducing device faster than normal speed, record said audio information in a compressed from, which is converted from the non-compressed form by a compressing device, and reproduce said audio information in the compressed form from said second reproducing device at normal speed for playback.

17. An information recording and reproducing apparatus comprising:

a first reproducing device for reproducing audio information from a first information record medium, in which the audio information is recorded;

a recording device for recording the reproduced audio information into a second information record medium in which random access is possible;

a second reproducing device for reproducing the audio information recorded in said second information record medium; and a controlling device for controlling said first reproducing device and said second reproducing device to simultaneously reproduce said audio information in a non-compressed form from said first reproducing device faster than normal speed, record said audio information in a compressed from, which is converted from the non-compressed form by a compressing device, and reproduce said audio information in the compressed form from said second reproducing device at normal speed for playback.

18. An information recording and reproducing apparatus comprising:

a first reproducing device for reproducing audio information from a first information record medium, in which the audio information is recorded;

a recording device for recording the reproduced audio information into a second information record medium in which random access is possible;

a second reproducing device for reproducing the audio information recorded in said second information record medium; and a controlling device for controlling said first reproducing device and said second reproducing device to simultaneously reproduce said audio information in a non-compressed form from said first reproducing device faster than normal speed, record said audio information in a compressed from, which is converted from the non-compressed form by a compressing device, and reproduce said audio information in the compressed form from said second reproducing device at normal speed for playback.

* * * * *